(12) United States Patent
Kim et al.

(10) Patent No.: US 7,535,883 B2
(45) Date of Patent: May 19, 2009

(54) HAND-OFF METHOD USING EDGE NODES IN MOBILE AD-HOC NETWORK

(75) Inventors: Jae-hoon Kim, Seoul (KR);
Shubhranshu Singh, Yongin-si (KR);
Young-gon Choi, Suwon-si (KR);
Yong-sung Roh, Icheon-si (KR);
Jung-ho Kim, Suwon-si (KR);
Kyung-lim Kang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 329 days.

(21) Appl. No.: 11/263,843

(22) Filed: Nov. 2, 2005

(65) Prior Publication Data

US 2006/0092898 A1    May 4, 2006

(30) Foreign Application Priority Data

Nov. 3, 2004    (KR) ...................... 10-2004-0088846

(51) Int. Cl.
*H04Q 7/24* (2006.01)
*H04Q 7/20* (2006.01)
*H04B 7/216* (2006.01)
*H04L 12/28* (2006.01)
*H04L 12/56* (2006.01)

(52) U.S. Cl. .................... 370/338; 370/342; 370/401; 455/436; 455/437; 455/438; 455/439; 455/440

(58) Field of Classification Search .............. 370/338, 370/342, 401; 455/436–443
See application file for complete search history.

(56) References Cited

U.S. PATENT DOCUMENTS

| 6,009,081 | A  | * | 12/1999 | Wheeler et al. | ............. | 370/255 |
| 6,430,155 | B1 | * | 8/2002 | Davie et al. | ................. | 370/232 |
| 6,879,574 | B2 | * | 4/2005 | Naghian et al. | ............ | 370/338 |
| 7,177,295 | B1 | * | 2/2007 | Sholander et al. | .......... | 370/338 |
| 7,190,678 | B2 | * | 3/2007 | Thubert et al. | ............. | 370/254 |
| 2006/0182038 | A1 | * | 8/2006 | Nalawade et al. | .......... | 370/252 |
| 2007/0183346 | A1 | * | 8/2007 | Thubert et al. | ............. | 370/254 |

FOREIGN PATENT DOCUMENTS

WO    WO 2005/015938    *    2/2005

OTHER PUBLICATIONS

Lee et al. "Hybrdi Gateway Advertisement Scheme for connecting mobile ad hoc networks to the Internet." VTC, 2003. Spring. The 57th Semiannual, vol. 1, pp. 191-195, Apr. 2003.*

(Continued)

*Primary Examiner*—Lester Kincaid
*Assistant Examiner*—Nathan Mitchell
(74) *Attorney, Agent, or Firm*—Staas & Halsey LLP

(57) ABSTRACT

A hand-off method including detecting edge nodes located at edges of a mobile ad-hoc network (MANET); retransmitting, at the detected edge nodes, an Internet gateway advertisement message (IGAM) at a new period; and performing a hand-off of a mobile device moving from an infrastructure network to the MANET using the retransmitted IGAM.

18 Claims, 2 Drawing Sheets

OTHER PUBLICATIONS

Ruiz et al. "Enhanced Internet connectivity for hybrid ad hoc networks through adaptive gateway discovery," Local Computer Networks, 2004. 29th Annual IEEE International Conference on, vol., No. pp. 370-377, Nov. 16-18, 2004.*

Ghassemian et al. "Analysis of Internet Gateway Discovery Protocols In Ad Hoc Networks", in Proc. of WCNC 2004, Atlanta, USA, Mar. 21-25, 2004.*

Macker et al. "INSC Phase 1: Task 6 Final Report", INSC/Task6/DU/008, Jan. 2004.*

* cited by examiner

HAND-OFF METHOD USING EDGE NODES IN MOBILE AD-HOC NETWORK

CROSS-REFERENCE TO RELATED APPLICATIONS

This application claims the benefit of Korean Patent Application No. 2004-0088846, filed on Nov. 3, 2004, in the Korean Intellectual Property Office, the disclosure of which is incorporated herein by reference.

BACKGROUND OF THE INVENTION

1. Field of the Invention

The present invention relates to a hand-off method using edge nodes in a mobile ad-hoc network to promptly detect mobility of a mobile device moving into the mobile ad-hoc network, and to configure an address by broadcasting an Internet gateway advertisement message (IGAM) so that the edge nodes in the mobile ad-hoc network satisfy the specification of a mobile Internet Protocol version 6 (IPv6).

2. Description of the Related Art

An ad-hoc network is a temporarily and autonomously constructed network including a plurality of nodes having mobility. The ad-hoc network has been developed to construct a temporary network in an area where there is no infrastructure network, or where it is not easy to deploy a network based on an infrastructure network. It is expected that the mobile ad-hoc network technology is applicable to diverse applications such as home networking, a sensor network, and a personal area network. To this end, the mobile ad-hoc network is under development as a next-generation network.

FIG. 1 illustrates a mobile ad-hoc network. Referring to FIG. 1, in the mobile ad-hoc network, mobile nodes communicate with each other according to peer-to-peer (P2P) using an air interface. As a global connectivity is supported between an infrastructure network and the mobile ad-hoc network, existing wireless LAN services can be expanded and various services can be provided to the nodes in the mobile ad-hoc network via the Internet.

A mobile ad-hoc network routing protocol enables communications among mobile ad-hoc nodes, and has been developed with the advent of the mobile ad-hoc network in 1970's. The standardization of the mobile ad-hoc network routing protocol is in progress at the Internet Engineering Task Force (IETF) mobile ad-hoc network (MANET) working group.

The MANET routing protocol is categorized into a proactive protocol and a reactive protocol.

The reactive routing protocol searches a route in response to traffic being generated. Route information is stored to each node located along a route, but is discarded if the route is not utilized for a predetermined time. A mobile node moving into the MANET determines its mobility from prefix information included in the IGAM, and configures an address. According to the reactive routing protocol, as the prefix information is not regularly provided, it is hard to determine the node mobility.

The proactive routing protocol enables the entirety of the mobile nodes to maintain the latest route information, and advertises routing information all over the network periodically or in response to changes being made to a network topology, so that the mobile nodes can update their routing information. The proactive routing protocol can route packets along an optimum route at all times without suffering from a delay, and enables the mobile devices entering the MANET to easily detect their mobility. However, when periodically transmitting the IGAM according to the mobile IPv6 specification, the entire network is subjected to a control packet overhead.

SUMMARY OF THE INVENTION

The present invention has been provided to solve the above-mentioned and/or other problems and disadvantages occurring in the conventional arrangement, and an aspect of the present invention provides a hand-off method using edge nodes in a mobile ad-hoc network (MANET) to reduce a control packet overhead over the network by detecting edge nodes located at edges of the ad-hoc network and promptly retransmitting an Internet gateway advertisement message (IGAM) so that only the detected edge nodes can meet the specification of a mobile Internet Protocol version 6 (IPv6).

Additional aspects and/or advantages of the invention will be set forth in part in the description which follows and, in part, will be apparent from the description, or may be learned by practice of the invention.

To achieve the above and/or other aspects and advantages of the present invention, a hand-off method includes detecting edge nodes located at edges of a mobile ad-hoc network (MANET); retransmitting, at the detected edge nodes, an Internet gateway advertisement message (IGAM) at a new period; and performing a hand-off of a mobile device moving from an infrastructure network to the MANET using the retransmitted IGAM.

The new period may be a random value ranging from approximately 0.03 to 0.07 seconds according to a mobile Internet Protocol version 6 (IPv6).

The new period may be proportional to a number of neighbor nodes having a same communication range as the edge nodes.

The new period may be calculated in accordance with the following equation:

new period=initial period * the number of neighbor nodes * $V$;

wherein the neighbor nodes are located within a same communication range covered by the edge nodes, the initial period is adjustable according to the number of neighbor nodes in a range from approximately 3 seconds to 16 seconds, and V is a random value more than 0 and less than 2.

The detecting of the edge nodes may include broadcasting the IGAM and an identifier (ID) indicating a number of times of sequentially broadcasting the IGAM from the Internet gateway to an intermediate node in the MANET; and establishing, at the intermediate node receiving the IGAM, a reverse route to the Internet gateway and retransmitting the received IGAM to a one-hop node, wherein the intermediate node is detected as one of the edge nodes in the MANET in response to the intermediate node not re-receiving a message transmitted from another intermediate node having a greater hop count than a hop count of the intermediate node.

The detecting of the edge nodes may further include not processing, at the intermediate node, IGAMs received after a second IGAM, and transmitting a discard information message to previous nodes that transmit the IGAMs after the second IGAM in response to the intermediate node receiving a plurality of IGAMs having a same ID from the previous nodes located at a same distance from the Internet gateway; and detecting the previous nodes that receive the discard information message as the edge nodes in the MANET.

The intermediate node may not process the IGAM received from the intermediate node having the greater hop count, and does not update a reverse route to the Internet gateway, in response to the intermediate node receiving an IGAM from a node having a smaller hop count than the intermediate node, and then receiving an IGAM having a same ID from another node having a greater hop count than the intermediate node.

The intermediate node may update a reverse route to the Internet gateway according to the IGAM received from the node having the smaller hp count in response to the intermediate node receiving an IGAM from a node having a greater hop count than the intermediate node, and then receiving an IGAM having a same ID from another node having a smaller hop count.

An intermediate node may update the reverse route to the Internet gateway in response to an IGAM having an increased ID being received.

The hop count may be a distance from the Internet gateway to the intermediate node.

According to another aspect of the present invention, a hand-off method includes adjusting a period of an IGAM; and retransmitting, at edge nodes of a MANET, the IGAM with the adjusted period.

According to another aspect of the present invention, a method of detecting edge nodes of a MANET includes broadcasting an IGAM and an ID indicating a number of times the IGAM is sequentially broadcasted form the Internet gateway to an intermediate node in the MANET; and establishing a reverse route from the intermediate node to the Internet gateway and retransmitting the received IGAM from the intermediate node to a one-hop node; wherein the intermediate node is detected as one of the edge nodes in response to the intermediate node not receiving a message from another intermediate node having a greater hop count.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
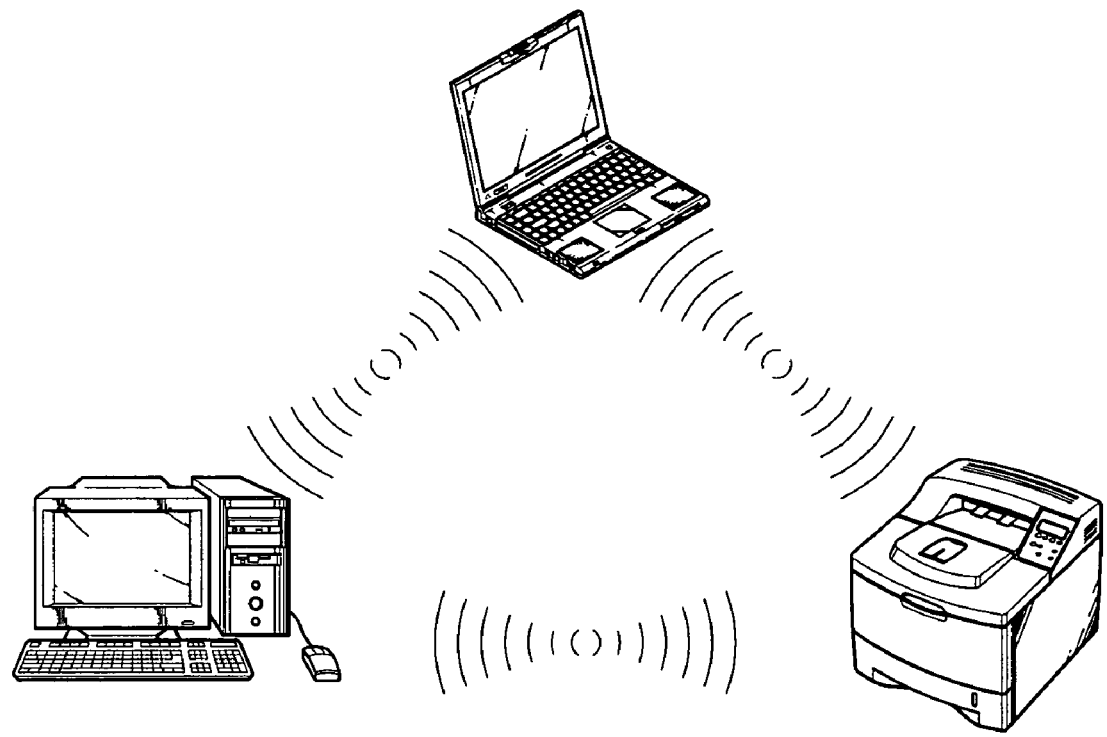
FIG. 1 illustrates a mobile ad-hoc network.

Reference will now be made in detail to embodiments of the present invention, examples of which are illustrated in the accompanying drawings, wherein like reference numerals refer to the like elements throughout. The embodiment is described below to explain the present invention by referring to the figures.

In the following description, drawing reference numerals may be repeated to describe repeated elements in different drawings. Some matters may be defined in the description along with a detailed construction, however, these elements are merely provided to assist in a comprehensive understanding of the invention. Thus, it is apparent that the present invention may be carried out without those particularly described elements. Also, well-known functions or constructions may not be described in detail, so as to not obscure the invention in unnecessary detail.

Figure 2:
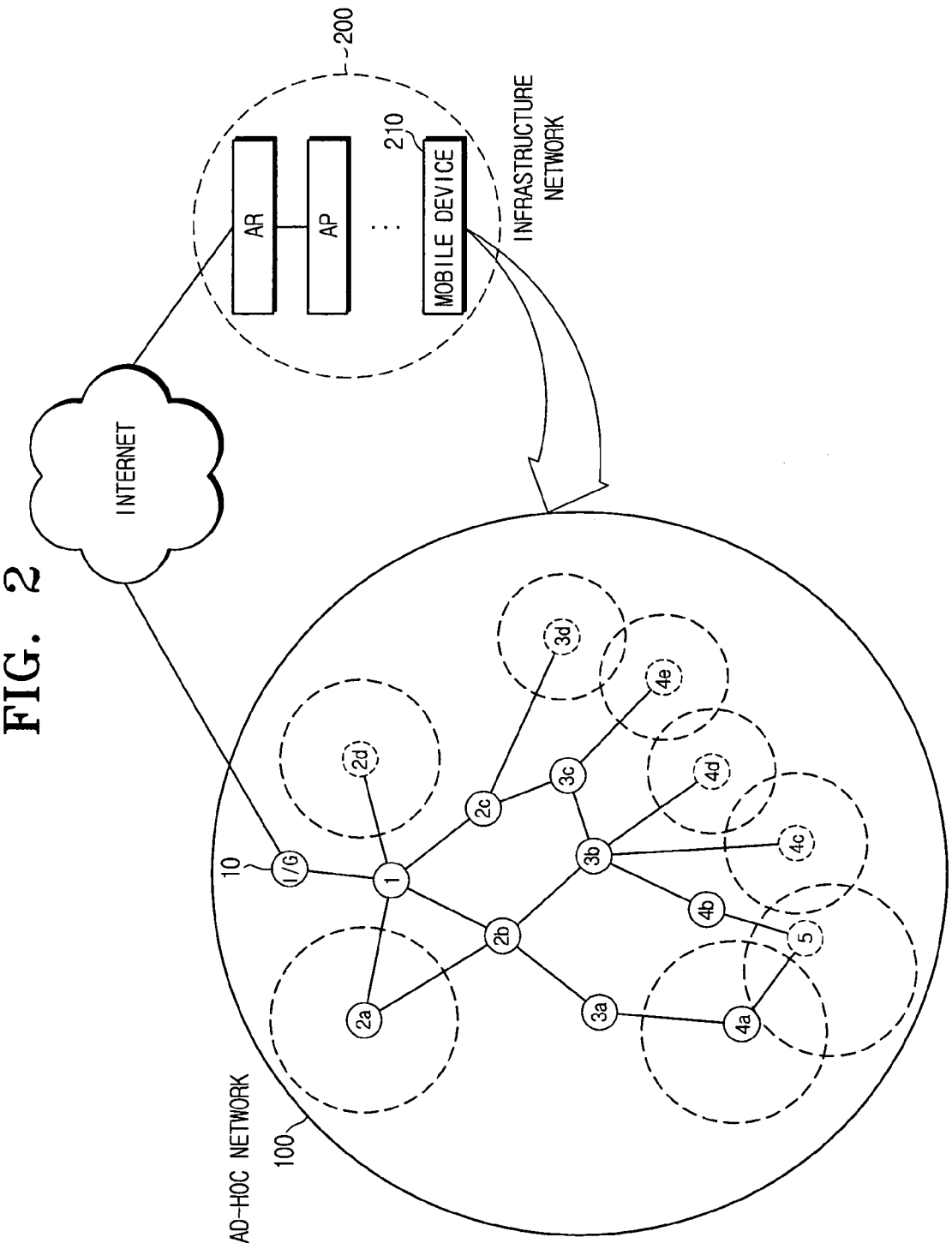
FIG. 2 illustrates a hand-off method using an edge node in a mobile ad-hoc network according to an embodiment of the present invention.

FIG. 2 illustrates a hand-off method using edge nodes in a mobile ad-hoc network (MANET) according to an embodiment of the present invention. Referring to FIG. 2, global connectivity is supported between an infrastructure network and the MANET. An Internet gateway 10 functions as follows: the Internet gateway 10 is a router which routes packets to be delivered to outside of the MANET, and is a provider of a global routable prefix.

The Internet gateway 10 broadcasts an ID having a long transfer period ranging from 3 seconds to 16 seconds, and broadcasts an Internet gateway advertisement message (IGAM) including its global address and prefix information. The ID indicates the number of times to transfer the IGAM by the Internet gateway 10. The larger the ID becomes, the later the message is transferred from the Internet gateway 10. When the Internet gateway 10 transmits a first IGAM, the ID is set to 1. Subsequently, the ID increases by one as the Internet gateway 10 broadcasts the IGAM.

Upon receiving the IGAM from the Internet gateway 10, an intermediate node establishes a reverse route to the Internet gateway 10 and retransmits the IGAM to one-hop neighbor intermediate nodes. The intermediate node stores the ID and the distance to the Internet gateway 10. The distance to the Internet gateway 10 is calculated from a hop limit of a IPv6 header.

In FIG. 2, an intermediate node 1, upon receiving the first IGAM from the Internet gateway 10, establishes a reverse route to the Internet gateway 10 and retransmits the received IGAM to its one-hop neighbor intermediate nodes 2a, 2b, 2c, and 2d. The intermediate node 1 stores the ID and the distance to the Internet gateway 10.

If an IGAM having the same ID is received from an intermediate node, the intermediate node discards the IGAM received from the intermediate node having a greater hop counter. For example, if the intermediate node 2a receives the IGAM from the intermediate node 1 first of all, the hop count from the Internet gateway 10 is 2. Afterwards, the intermediate node 2a may receive the IGAM having the same ID from the intermediate node 2b. In this situation, as the IGAM from the intermediate node 2b has a hop count of 3, the intermediate node 2a does not process the IGAM from the intermediate node 2b, and does not update the reverse route.

If an intermediate node receives an IGAM having a smaller hop count and the same ID afterwards, the intermediate node updates the reverse route to the Internet gateway 10. For example, the intermediate node 2a may first receive the IGAM from the intermediate node 2b, according to the characteristic of the wireless environment, and then receive the IGAM from the intermediate node 1. The IGAM from the intermediate node 1 has the hop count of 2, which is below the hop count (3) of the IGAM from the intermediate node 2b, so the intermediate node 2a updates the reverse route to the Internet gateway 10. The intermediate node 2a needs to inform the intermediate node 1, being the previous intermediate node, of the updating of the reverse route.

In a case in which an intermediate node receives an IGAM having an increased ID, the intermediate node 1 has to update the reverse route to the Internet gateway 10.

Meanwhile, if the ID is the same, when the intermediate node does not receive the message retransmitted from another intermediate node having a greater hop count, it is determined that there are no intermediate nodes having a greater hop count than its hop count. The intermediate node becomes an edge node in the MANET. For example, an intermediate node 5 recognizes itself as an edge node since the intermediate node 5 does not receive any message from an intermediate node having a greater hop count than its hop count.

The following explains a case in which an intermediate node re-receives a message retransmitted from another intermediate node having a greater hop count than its hop count. The intermediate node determines whether a plurality of intermediate nodes having a same hop count first transmit the IGAM to an intermediate node having a greater hop count. At this time, the ID of the IGAM is the same.

If a certain intermediate node receives a plurality of IGAMs having the same ID from previous intermediate nodes that are located at a same distance from the Internet gateway 10, the certain intermediate node receiving the IGAMs does not process IGAMs received after the second IGAM, and transmits a discard information message to the previous intermediate nodes that transmit the IGAMs after the second IGAM. The previous intermediate nodes receiving the discard information message become edge nodes in a spanning tree if there are no more intermediate nodes located farther from the Internet gateway 10. In result, the spanning tree is constructed from the Internet gateway 10, and the optimum edge node can be detected. For instance, when receiving the IGAM first from the intermediate node 4b, the intermediate node 5 does not process the IGAM received from the intermediate node 4a, but transmits the discard information message to the intermediate node 4a. Upon receiving the discard information message, the intermediate node 4a becomes the edge node in the spanning tree if there is no intermediate node located farther from the Internet gateway 10.

The detected edge nodes broadcast the IGAM to a one-hop distance at a new period compliant with the mobile IPv6 specification. The new period can be obtained in accordance with Equation 1:

$$\text{new period} = \text{initial period} * \text{the number of neighbor nodes} * V \quad \text{[Equation 1]}$$

In Equation 1, the neighbor intermediate nodes are located within a same communication range as the edge nodes, and the initial period can be adjusted properly between 3 seconds and 16 seconds based on the number of the neighbor intermediate nodes. 'V' is a random value more than 0 and less than 2. The 'V' is applied to prevent collisions of the IGAMs transmitted from the neighbor intermediate nodes. The obtained new period based on Equation 1 is randomly set ranging from 0.03 seconds to 0.07 seconds to meet the mobile IPv6 specification.

Since only the edge nodes set the retransmission period of the IGAM according to the mobile IPv6 specification, the IGAM can be transmitted more rapidly and the IGAM information can be promptly delivered to the mobile device moving into the ad-hoc network. Thus, the mobile device can rapidly detect its mobility and rapidly configure its address. As a result, the communications in the ad-hoc network can be continuously maintained.

As explained above, only the edge nodes in the MANET retransmit the IGAM according to the mobile IPv6 specification. Hence, the overhead on the MANET can be reduced and the mobile device moving into the MANET can rapidly receive the IGAM. As the mobile node can promptly detect the mobility and configure the address, the hand-off can be supported when the mobile device moves from the infrastructure network to the MANET.

Although one possible embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A method of detecting a node location of a mobile ad-hoc network (MANET), the method comprising:
    receiving, at a node in the MANET, an Internet gateway advertisement message (IGAM) transmitted by an Internet gateway and a predetermined identifier (ID) indicating a number of times of sequentially broadcasting the IGAM;
    establishing, at the node, a reverse route to the Internet gateway which transmitted the IGAM, and retransmitting the received IGAM to an external one-hop node; and
    determining, at the node, that the node is an edge node in the MANET if the node does not receive a message retransmitted from another node having a greater hop count than a hop count of the node.

2. The method of claim 1, further comprising:
    failing to process, at the node, IGAMs received after a second IGAM, and transmitting a discard information message to previous nodes that transmitted the IGAMs after the second IGAM if the node received a plurality of IGAMs having a same ID from the previous nodes located at a substantially equal distance from the Internet gateway.

3. The method of claim 2, further comprising:
    determining, at the node, that the node is an edge node in the MANET if the node receives the discard information message from the external node.

4. The method of claim 1, wherein if the node receives an IGAM from an external node having a smaller hop count than the node, and then receives an IGAM having a same ID from another node having a greater hop count than the node, the node fails to process the IGAM received from the node having the greater hop count and fails to update a reverse route to the Internet gateway.

5. The method of claim 1, wherein if the node receives an IGAM from an external node having a greater hop count than the node, and then receives an IGAM having a same ID from another node having a smaller hop count, the node updates a reverse route to the Internet gateway according to the IGAM received from the node having the smaller hop count.

6. The method of claim 1, further comprising:
    updating, at the node, the reverse route to the Internet gateway if an IGAM having an increased ID is received.

7. The method of claim 1, wherein the hop count represents a distance from the Internet gateway to the node.

8. A method of operating a node in a mobile ad-hoc network (MANET), the method comprising:
    determining, at a node having a period in the MANET, whether the node is an edge node; and
    establishing, at the node, a new period with reference to a number of neighbor nodes and retransmitting an Internet gateway advertisement message (IGAM) at the new period when it is determined the node is the edge node, wherein the determining comprises:
    receiving an IGAM and a predetermined identifier (ID) indicating a number of times of sequentially broadcasting the IGAM;
    establishing a reverse route to the Internet gateway which transmitted the IGAM, and retransmitting the received IGAM to an external one-hop node; and
    determining, at the node, that the node is an edge node in the MANET if the node does not receive a message retransmitted from another node having a greater hop count than a hop count of the node.

9. A method of operating a node in a mobile ad-hoc network (MANET), the method comprising:
    determining, at a node having a period in the MANET, whether the node is an edge node; and
    establishing, at the node, a new period with reference to a number of neighbor nodes and retransmitting an Internet gateway advertisement message (IGAM) at the new period when it is determined the node is the edge node, wherein the new period is a random value ranging from 0.03 second to 0.07 second according to a mobile Internet Protocol version 6 (IPv6).

10. A method of operating a node in a mobile ad-hoc network (MANET), the method comprising:
   determining, at a node having a period in the MANET, whether the node is an edge node; and
   establishing, at the node, a new period with reference to a number of neighbor nodes and retransmitting an Internet gateway advertisement message (IGAM) at the new period when it is determined the node is the edge node, wherein the new period is proportional to a number of neighbor nodes having a same communication range as the edge node.

11. A method of operating a node in a mobile ad-hoc network (MANET), the method comprising:
   determining, at a node having a period in the MANET, whether the node is an edge node; and
   establishing, at the node, a new period with reference to a number of neighbor nodes and retransmitting an Internet gateway advertisement message (IGAM) at the new period when it is determined the node is the edge node, wherein the new period is calculated in accordance with an equation as follows:

new period=initial period * the number of neighbor nodes * v wherein the neighbor nodes are located within a same communication range as the edge node, an initial period is adjustable according to the number of neighbor nodes in a range from 3 seconds to 16 seconds, and V is a random value greater than 0 and less than 2.

12. A node in a mobile ad-hoc network (MANET), comprising:
   a first means which receives an Internet gateway advertisement message (IGAM) and a predetermined identifier (ID) indicating a number of times of sequentially broadcasting the IGAM;
   a second means which establishes a reverse route to an Internet gateway which transmitted the IGAM, and retransmits the received IGAM to an external one-hop node; and
   a third means which determines that the node is an edge node in the MANET if the node does not receive a message retransmitted from another node having a greater hop count than a hop count of the node.

13. A node in a mobile ad-hoc network (MANET), the node having a period, the node comprising:
   a first means which determines if the node is an edge node; and
   a second means which establishes a new period with reference to a number of neighbor nodes, and retransmits an IGAM at the new period if the node is the edge node.

14. The node of claim 13, wherein the first means establishes a reverse route to an Internet gateway which transmitted the IGAM, and retransmits the received IGAM to an external one-hop node if
   the node receives the IGAM and a predetermined identifier (ID) indicating a number of times of sequentially broadcasting the IGAM, and the first means determines that the node is the edge node in the MANET if the node does not receive a message retransmitted from another node having a greater hop count than a hop count of the node.

15. A mobile ad-hoc network (MANET), comprising:
   an Internet gateway which broadcasts an Internet gateway advertisement message (IGAM) and an identifier (ID) indicating the number of times the IGAM is sequentially broadcasted from the Internet gateway to a node in the MANET; and
   the node which receives the IGAM establishes a reverse route from the node to the Internet gateway, and retransmits the received IGAM from the node to a one-hop node,
   wherein if a message from another node having a greater hop count is not received, the node is an edge node of the MANET.

16. A mobile ad-hoc network (MANET), comprising:
   a node which detects edge nodes located at edges of the mobile ad-hoc network (MANET) in which edge nodes are detected to be located at edges and retransmit an Internet gateway advertisement message (IGAM) at a period; and
   a mobile device which performs a hand-off using the retransmitted IGAM,
   wherein the period is proportional to a number of neighbor nodes having a communication range in accordance with a communication range of the edge nodes.

17. A mobile ad-hoc network (MANET), comprising:
   a node which detects edge nodes located at edges of the mobile ad-hoc network (MANET), in which the edge nodes are detected to be located at edges and retransmit an Internet gateway advertisement message (IGAM) at a period; and
   a mobile device which performs a hand-off using the retransmitted IGAM,
   wherein the period is a random value ranging from 0.03 second to 0.07 second according to a mobile Internet Protocol version 6 (IPv6).

18. A mobile ad-hoc network (MANET), comprising:
   a node which detects edge nodes located at edges of the mobile ad-hoc network (MANET), in which the edge nodes are detected to be located at edges and retransmit an Internet gateway advertisement message (IGAM) at a period; and
   a mobile device which performs a hand-off using the retransmitted IGAM,
   wherein the period is calculated in accordance with an equation as follows:

new period=initial period * a number of neighbor nodes * V wherein the neighbor nodes are located within a communication range of the edge nodes, the initial period is adjustable according to the number of neighbor nodes in a range from 3 seconds to 16 seconds, and V is a random value greater than 0 and less than 2.

* * * * *

UNITED STATES PATENT AND TRADEMARK OFFICE
CERTIFICATE OF CORRECTION

PATENT NO.         : 7,535,883 B2
APPLICATION NO. : 11/263843
DATED                  : May 19, 2009
INVENTOR(S)        : Jae-hoon Kim et al.

It is certified that error appears in the above-identified patent and that said Letters Patent is hereby corrected as shown below:

Title Page, Column 2 Item [56] (Other Publications), Line 2, after "57th" insert --IEEE--.

Title Page, Column 2 Item [56] (Other Publications), Line 3, change "Seminiannual," to --Semiannual,--.

Column 7, Line 27 Claim 11, change "nodes v" to --nodes V--.

Signed and Sealed this

First Day of September, 2009

David J. Kappos
*Director of the United States Patent and Trademark Office*